United States Patent
Petersen et al.

(10) Patent No.: US 12,368,400 B2
(45) Date of Patent: Jul. 22, 2025

(54) SENSING ROTOR DISPLACEMENT USING STATOR POWER WINDING

(71) Applicant: Wisconsin Alumni Research Foundation, Madison, WI (US)

(72) Inventors: Nathan Petersen, Madison, WI (US); Eric Severson, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 119 days.

(21) Appl. No.: 18/316,511

(22) Filed: May 12, 2023

(65) Prior Publication Data

US 2023/0378893 A1 Nov. 23, 2023

Related U.S. Application Data

(60) Provisional application No. 63/365,098, filed on May 20, 2022.

(51) Int. Cl.
*H02P 21/00* (2016.01)
*H02P 21/18* (2016.01)

(52) U.S. Cl.
CPC .................. *H02P 21/18* (2016.02)

(58) Field of Classification Search
CPC .......... H02P 41/00; H02P 21/20; H02P 21/22; H02P 21/18
See application file for complete search history.

(56) References Cited

U.S. PATENT DOCUMENTS 7,667,418 B2 * 2/2010 Kascak ............... H02P 21/0003
318/400.07

2009/0058335 A1 * 3/2009 Kascak ............... H02P 21/0003
310/90.5

FOREIGN PATENT DOCUMENTS

CN 102545744 A * 7/2012

OTHER PUBLICATIONS

AJ Marques Cardoso et al.; "Computer-aided detection of airgap eccentricity in operating three-phase induction motors by Park's vector approach." IEEE Transactions on Industry Applications 29, No. 5 (Sep./Oct. 1993): pp. 897-901. US.
Takahiro Tera et al.; "Performances of bearingless and sensorless induction motor drive based on mutual inductances and rotor displacements estimation." IEEE Transactions on Industrial Electronics 53, No. 1 (Feb. 2006): pp. 187-194. US.
Hua et al.; "Rotor radial displacement sensorless control of bearingless permanent magnet synchronous motor based on MRAS and suspension force compensation." ISA transactions 103 (2020): pp. 306-318.
Akira Chiba et al.; "A PWM harmonics elimination method in simultaneous estimation of magnetic field and displacements in bearingless induction motors." IEEE Transactions on Industry Applications 48, No. 1 (Jan./Feb. 2011): pp. 124-131. US.
Kang et al.; "Saliency-Based Rotor Spatial Position Displacement Self-Sensing for Self-Bearing Machines." Sensors 22, No. 24 (2022): 9663, pp. 1-18. US.

(Continued)

*Primary Examiner* — Karen Masih
(74) *Attorney, Agent, or Firm* — Boyle Fredrickson SC

(57) ABSTRACT

A rotating electrical machine (motor or generator) includes a controller evaluating rotor displacement using a combined winding that also provides for torque coupling to the rotor through the use of a model relating rotor offset to at least one of resistance, inductance, or back-EMF measured through a combined winding.

17 Claims, 5 Drawing Sheets

(56) References Cited

OTHER PUBLICATIONS

Li et al; "Analysis and control of seven-phase permanent-magnet bearingless motor with single set of half-coiled winding." In 2014 IEEE 23rd International Symposium on Industrial Electronics (ISIE), pp. 2080-2086. IEEE, 2014.

Kang et al; "Analysis and experiment of a 6-phase bearingless induction motor." In 2008 International Conference on Electrical Machines and Systems, pp. 990-994. IEEE, 2008.

Wang et al.; "Eccentricity detection of a six-phase induction motor with HFI." IET Electric Power Applications 13, No. 11 (2019): 1717-1725.

Wang et al.; "Radial position detection of five-phase bearingless PM motor." In 2016 XXII International Conference on Electrical Machines (ICEM), pp. 2602-2608. IEEE, 2016.

\* cited by examiner

BEARINGLESS MOTOR WINDING MODEL PARAMETERS: R, L, AND $e_{\alpha\beta}$ IN DECOUPLED $\alpha\beta$ COORDINATES

| WINDING | R MATRIX OF (19) | R MATRIX OF (19) | $e_{\alpha\beta}$ VECTOR OF (19)$^\alpha$ |
|---|---|---|---|
| MP COMBINED | $\begin{bmatrix} R & 0 & \nu_x M' & \nu_y M' \\ 0 & R & -\nu_y M' & \nu_x M' \\ \nu_x M' & -\nu_y M' & R & 0 \\ \nu_y M' & \nu_x M' & 0 & R \end{bmatrix}$ | $\begin{bmatrix} L_t & 0 & xM' & yM' \\ 0 & L_t & -yM' & xM' \\ xM' & -yM' & L_s & 0 \\ yM' & xM' & 0 & L_s \end{bmatrix}$ | $\begin{bmatrix} -\lambda_{PM}, t^\omega \sin(\theta) \\ +\lambda_{PM}, t^\omega \cos(\theta) \\ -\lambda'_{PM}, s\Delta\alpha \\ +\lambda'_{PM}, s\Delta\beta \end{bmatrix}$ |
| BRIDGE DPNV | $\begin{bmatrix} R & 0 & \nu_x M' & -\nu_y M' \\ 0 & R & -\nu_y M' & -\nu_x M' \\ \nu_x M' & -\nu_y M' & R & 0 \\ -\nu_y M' & -\nu_x M' & 0 & R \end{bmatrix}$ | $\begin{bmatrix} L_t & 0 & xM' & -yM' \\ 0 & L_t & -yM' & -xM' \\ xM' & -yM' & L_s & 0 \\ -yM' & -xM' & 0 & L_s \end{bmatrix}$ | $\begin{bmatrix} -\lambda_{PM}, t^\omega \sin(\theta) \\ +\lambda_{PM}, t^\omega \cos(\theta) \\ -\lambda'_{PM}, s\Delta\alpha \\ +\lambda'_{PM}, s\Delta\beta \end{bmatrix}$ |
| PARALLEL DPNV | $\begin{bmatrix} \frac{1}{2}(R+\nu_x M') & \frac{1}{2}\nu_y M' & \frac{1}{2}(R-\nu_x M') & \nu_y M' & R+\nu_x M' \\ \frac{1}{2}\nu_y M' & \nu_x M' & \nu_y M' & 2R & 0 \\ \nu_x M' & \nu_y M' & 2R & 0 & \nu_x M' \\ \nu_y M' & -\nu_x M' & 0 & R & \nu_y M' \\ R+\nu_x M' & \nu_y M' & \nu_x M' & \nu_y M' & R-\nu_x M' \end{bmatrix}$ | $\begin{bmatrix} \frac{1}{2}(L_t+xM') & \frac{1}{2}yM' & \frac{1}{2}(L_t-xM') & yM' & L_s+xM' & yM' \\ \frac{1}{2}yM' & xM' & yM' & 2L_t & 0 & xM' \\ xM' & yM' & 2L_t & 0 & xM' & yM' \\ yM' & -xM' & 0 & 2L_s & yM' & L_s-xM' \\ L_t+xM' & yM' & xM' & yM' & L_s-xM' & 0 \\ yM' & -xM' & yM' & -xM' & 0 & 2L_s \end{bmatrix}$ | $\begin{bmatrix} -\lambda_{PM}, t^\omega \sin(\theta)-\lambda'_{PM}, s\Delta\alpha \\ +\lambda_{PM}, t^\omega \cos(\theta)-\lambda'_{PM}, s\Delta\alpha \\ -\lambda'_{PM}, s\Delta\alpha \\ -2\lambda'_{PM}, s\Delta\alpha \\ -2\lambda'_{PM}, \\ -2\lambda'_{PM}, s\Delta\beta \end{bmatrix}$ |
| MCI | $\begin{bmatrix} 2R & 0 & \nu_x M' \\ 0 & 2R & \nu_y M' \\ \nu_x M' & \nu_y M' & \frac{1}{2}(R+\nu_x M') & \frac{1}{2}\nu_y M' \\ \nu_y M' & R-\nu_x M' & \frac{1}{2}\nu_y M' \end{bmatrix}$ | $\begin{bmatrix} 2L_t & 0 & xM' & yM' \\ 0 & 2L_t & yM' & -xM' \\ xM' & yM' & \frac{1}{2}(L_s+xM') & \frac{1}{2}yM' \\ L_t-xM' & yM' & \frac{1}{2}yM' & \frac{1}{2}(L_s-xM') \end{bmatrix}$ | $\begin{bmatrix} -2\lambda'_{PM}, t^\omega \sin(\theta) \\ -2\lambda'_{PM}, t^\omega \cos(\theta) \\ -\lambda_{PM}, t^\omega \sin(\theta)-\lambda'_{PM}, s\Delta\alpha \\ +\lambda_{PM}, t^\omega \cos(\theta)-\lambda'_{PM}, s\Delta\beta \end{bmatrix}$ |

$^\alpha \Delta\alpha = [(y_\omega \ \nu_x) \cos(\theta)+(x_\omega+\nu_y)\sin(\theta)]$ and $\Delta\beta = [(x_\omega+\nu_y)\cos(\theta) \ (y_\omega \ \nu_x)\sin(\theta)]$

FIG. 7

SENSING ROTOR DISPLACEMENT USING STATOR POWER WINDING

CROSS REFERENCE TO RELATED APPLICATION

This application claims the benefit of U.S. provisional application 63/365,098 filed May 20, 2022, and hereby incorporated by reference.

STATEMENT REGARDING FEDERALLY SPONSORED RESEARCH OR DEVELOPMENT

--

BACKGROUND OF THE INVENTION

The present invention relates to electrical machines such as motors and generators and, in particular, to a system for detecting off-axis rotor displacement.

Electrical motors and generators employ a rotor that may rotate about an axis with respect to a stator. A shaft attached to the rotor and aligned with the axis may transmit power from the rotor, when the electrical machine is a motor, or, when the electrical machine is a generator, the shaft may be rotated by an external source of power such as a turbine or the like.

The shaft of the rotor is typically supported by bearings, such as ball or roller bearings, minimizing frictional losses during machine operation. As an alternative to mechanical bearings, magnetic bearings may be employed which levitate the shaft magnetically, further reducing frictional losses as well as the need to replace mechanical bearings subject to wear over time.

"Bearingless" motors extend the idea of magnetic levitation to the rotor itself, using a so-called "combined winding" to both apply torque to the rotor and a levitating normal force to the rotor, the levitating normal force being perpendicular to the rotational axis. Such bearingless motors may also have lightweight ancillary mechanical bearings for startup or to resist axial forces, but primarily to support the rotor using magnetic levitation. Such bearingless motors may either provide a separate set of coils for levitation force and torque or may use so-called "combined" winding which provides both levitation force and torque.

The levitation used in bearingless motors requires a real-time sensing of rotor displacement, such displacement being a translational shifting of the rotor's rotational axis perpendicular to that axis. Such sensing can be done optically or through the use of a special sensing coil and associated sensing electronics, for example, a sensing stator coil inductance as a proxy for rotor displacement. The detection of rotor displacement may also be useful for monitoring motor health, for example, bearing wear in a motor with conventional mechanical bearings.

Deducing rotor offset can be done in a bearingless motor by control and monitoring of the different currents in the levitating force coils and torque coils as they interact with the stator, and in this way avoiding the need for separate rotor position sensors. Such an approach is generally not known in combined winding motors, outside of the special case of a five-phase motor.

SUMMARY OF THE INVENTION

The present inventors have determined that rotor displacement can be determined by monitoring voltage and current flow in one or more windings of a combined winding motor by means of a model that accommodates the coupling of levitation and torsional currents in combined windings. In particular, the inventors have determined that through a generalized Clark transformation, the effective R and L matrices describing the electrical property of the motor become equivalent for combined windings and separated winding motors allowing the techniques used for separated winding motors to be readily extended toward a wider variety of motor types.

In one embodiment, the invention provides a rotating electrical machine having a rotor having a shaft for rotation along a shaft axis and a stator operating with the rotor to provide a three- or six-phase rotating electrical machine and providing a set of combined windings, the set of combined windings capable of creating a first rotational magnetic field harmonic associated with torque production for rotation of the rotor when the electrical machine is operating as a motor, and capable of generating electrical current from rotation of the rotor when the electrical machine is operating as a generator, and capable of measuring a second rotational magnetic field harmonic associated with displacement of the rotor perpendicular to the shaft axis. A controller measuring at least one of electrical voltage and current in at least one phase of at least one combined winding deduces rotor offset position with respect to the stator perpendicular to this shaft axis by applying the measured voltage and current to a motor model to obtain two perpendicular components of rotor offset position.

It is thus a feature of at least one embodiment of the invention to provide for rotor displacement measurements without the need for a single-purpose separate winding or sensor that can work with common three- or six-phase motors.

The controller may further control the electrical voltage and current in the combined windings to apply a levitating force to the rotor based on the obtained two perpendicular components of rotor offset position.

It is thus a feature of at least one embodiment of the invention to provide a simplified bearingless motor design for motors with combined windings.

The model may provide a relationship between at least one of effective resistance, inductance, and back EMF between the rotor and the at least one combined winding as a function of the two perpendicular components of rotor offset position.

It is thus a feature of at least one embodiment of the invention to provide multiple proxies for rotor translation having advantages at different rotor speeds.

The controller may apply the measured voltage and current to multiple models providing different relationships between effective resistance, inductance, and back EMF between the rotor and the at least one combined winding as a function of the two perpendicular components of rotor offset position and may combine those measurements to provide the two perpendicular components of rotor offset position.

It thus a feature of at least one embodiment of the invention to provide a more robust rotor offset determination through the combination of different proxy measurements.

These particular objects and advantages may apply to only some embodiments falling within the claims and thus do not define the scope of the invention.

BRIEF DESCRIPTION OF THE DRAWINGS

FIG. 7 is a table summarizing the models developed by the present inventors.

DETAILED DESCRIPTION OF THE PREFERRED EMBODIMENT

Figure 1:
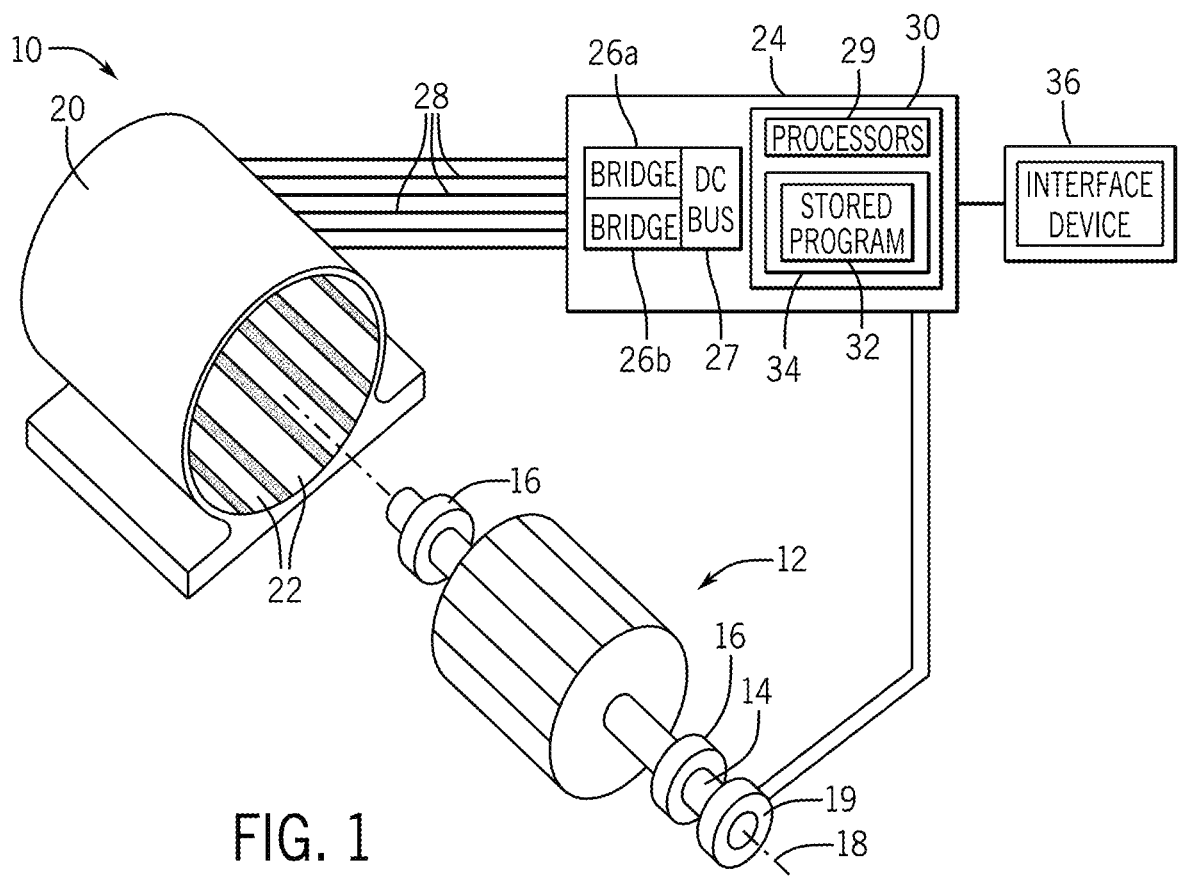
FIG. 1 is an exploded perspective view of a machine constructed according to one embodiment of the present invention.

Referring now to FIG. 1, an electric machine 10 may include a rotor 12, for example, being a permanent magnet or squirrel cage rotor or the like. The rotor 12 is attached to a shaft 14, for example, to transmit or receive rotational power, the shaft 14 supported on bearings 16 for rotation about an axis 18. The rotor 12 fits concentrically within a stator 20 providing a set of internal windings producing and defining stator teeth 22 spaced angularly about the axis 18. Multiple or non-integer numbers of teeth 22 can define magnetic poles of the motor depending on the winding configuration. For clarity of description, the electric machine 10 will be discussed only in the context of operation as a motor; however, it will be understood that the present invention is generally applicable to both motors and electrical generators.

Figure 2:
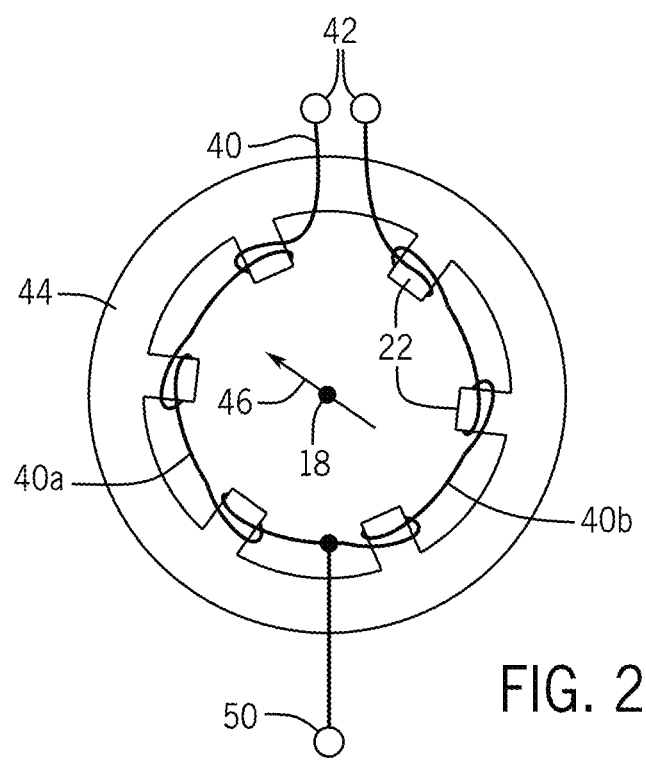
FIG. 2 is a simplified depiction of a single winding showing its association with multiple poles and a tap to produce a combined winding allowing for levitation and for sensing displacement perpendicular to the axis of rotation according to one embodiment of the invention.

Referring now also to FIG. 2, the windings 40 of the stator 20 may be connected to a controller 24, for example, providing an inverter having a first and second bridge system 26a, 26b (for example, three half-bridges for three-phase power) communicating with a DC bus 27 to synthesize AC waveforms, for example, 3-phase power, on connecting lines 28 using pulse width modulation. The bridge systems 26 may be controlled by an electronic computer 30, for example, including one or more processors 29 executing a stored program 32 held in computer memory 34 to synthesize arbitrary waveforms. The controller 24 may generally communicate with a human interface device 36 such as a computer terminal having a graphic display screen, and a keyboard, mouse, and the like, to output values and receive commands, respectively, from a human operator.

In one embodiment, a given combination stator winding 40 (only one shown in FIG. 2) may provide a pair of end terminals 42, one to receive power from the controller 24 (42a, 42b, and 42c) and one connected to a junction joining all of the windings 40. Each stator winding 40 may be wound on an armature 44, for example, of mild steel or the like, to define multiple stator teeth 22 generally distributed evenly about the axis 18 and alternating in magnetic polarity, together defining a set of three or six stator phases. In the present invention, when used either as a motor or a generator, each stator winding 40 will contribute to applying torque to the rotor 12 (for a motor) or generating current in response to rotor torque (for a generator), a property that will be termed "torque coupling" herein and which distinguishes the windings 40 from separate coils used for rotor sensing which do not contribute to power transfer between the rotor 12 and stator 20. Each of the windings 40 will also allow for the generation of a levitating force (thus being a combination winding), although the invention contemplates that in some cases only a single winding 40 may be a combination winding, a configuration which is insufficient for levitation but suitable for the present invention's tracking of rotor displacement. In one example, which will be discussed in detail, the combination winding provides a tap 50 allowing separate control of current in different poles of different numbers and, in this case, creates series-connected winding portions 40a and 40b joined at the tap 50.

Figure 3:
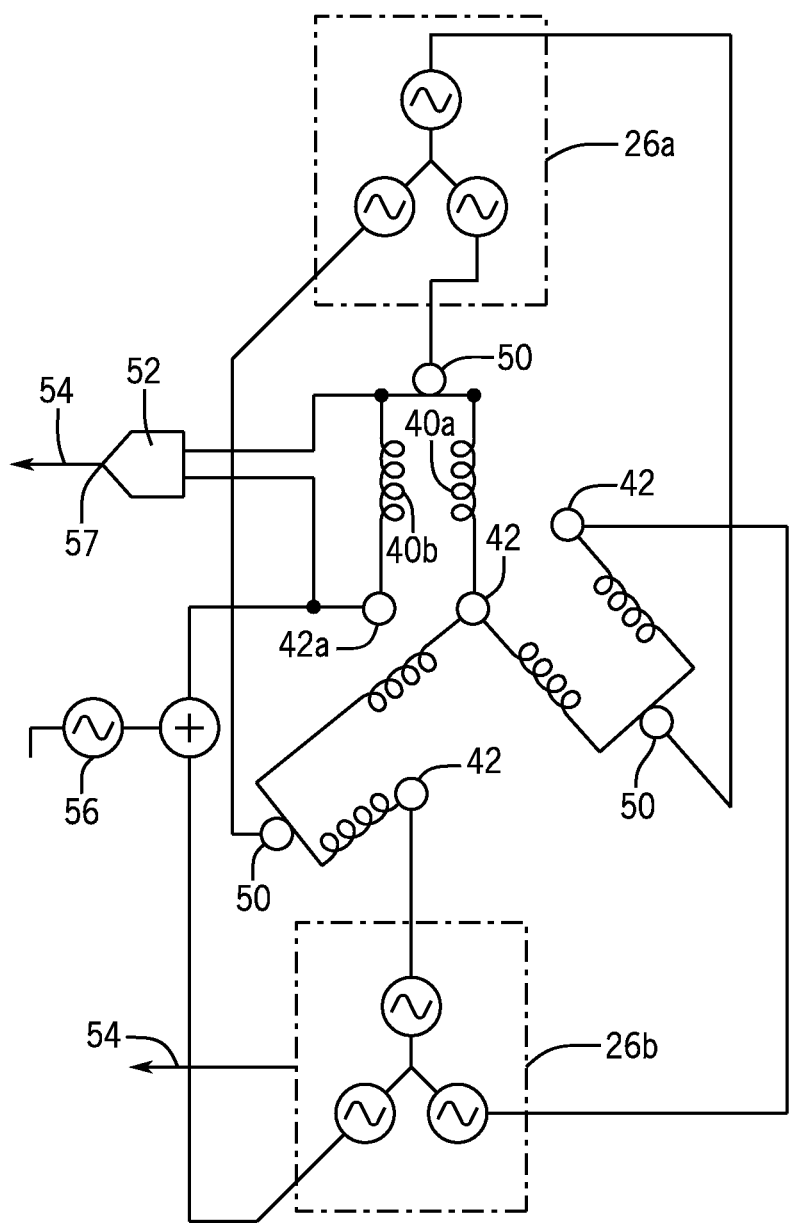
FIG. 3 is a schematic diagram showing a connection to the combined winding to measure back EMF and inductance and signal injection for that purpose.

Referring now to FIG. 3, the tap 50 may optionally be reproduced for each winding 40 when magnetic levitation is desired and may be driven by a different waveform using the separate bridge system 26a with bridge system 26b connecting to terminal 42. In this case, bridge system 26a provides differential torque currents through winding portions 40a and 40b while the bridge system 26b applies current through the entire winding 40. A combination of these currents produces the necessary torque and magnetic levitation.

By providing separate access to winding portion 40b, via terminal 42a and tap 50, changes in back EMF associated with displacement of the rotor 12 can be detected, for example, by monitoring the voltage across winding portion 40b as will be discussed below. This voltage can be acquired by the controller 24, for example, by using an A/D converter 52 connected across the winding portion 40b. Alternatively, it will be appreciated that a separate instrumentation of this winding portion 40b may not be necessary, but rather this voltage can be derived by monitoring the control loop of the bridge systems 26a and 26b which will naturally compensate for back EMF changes. In either case, a back EMF signal 54 is obtained and provided to the controller processor 29.

The same winding portion 40b may also be used to derive a measure of inductance (mutual inductance being an inductance with other portions of the stator) caused by the displaced rotor 12, for example, by injecting a high-frequency test signal 56 into the winding 40b (typically much higher in frequency than the operating frequency of the winding 40 in producing torque so as not to interfere with motor operation). The attenuation of the -high frequency test signal 56 by inductive coupling and eddy current losses may then be measured to produce an indication of winding inductance, for example, again detected by A/D converter 52, for example, by time multiplexing the measurement of the signal 56 in between measurements of back EMF signal 54. Although the high-frequency test signal 56 is shown as a separate structure from the bridge systems 26, in practice it will be synthesized simply by superimposing the necessary signal on the control signals used for the bridge systems 26a and 26b.

This high-frequency test signal 56 may also be used to make a measure of resistance (mutual resistance being effective resistance through the winding).

Referring again momentarily to FIG. 1, the shaft 14 may also connect to a tachometer/encoder providing position and velocity information to the controller 24.

Figure 4:
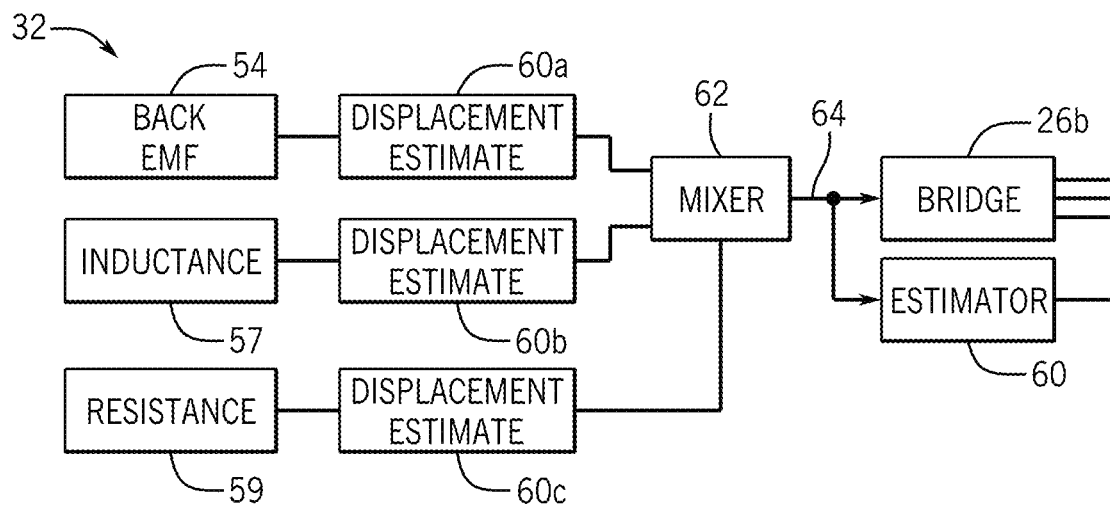
FIG. 4 is a block diagram of operation of the controller to combine back EMF and inductance measurements to provide a rotor displacement value.

Referring now to FIG. 4, the program 32 executed by the controller 24 may receive the back EMF measurement 54, the inductance measurements 57, and the resistance measurement 59, to produce for each measurement independent displacement estimates per displacement estimators 60a, 60b, and 60c. These displacement estimators 60a, 60b, and

60c, for example, may operate by modeling the motor or by using stored values obtained from empirical measurement as will be discussed below.

These independent measurements of the displacement estimator 60a and 60b may then be blended by a mixer 62, for example, to produce a displacement measurement 64 using a fixed weighting system or preferably a weighting that is dynamically adjusted according to motor speed to provide greater weighting for the back EMF value as motor speed increases. The rotor displacement measurement 64 may then be used for control of the H bridge 26b, for example, for magnetic levitation feedback or may be provided to a logging system 66 that tracks drift in the displacement of the rotor 12 over time, for example, to detect changes associated with imminent failure of a bearing or the like as that displacement moves outside of predetermined replacement thresholds.

The Motor Displacement Model

By definition, bearingless motor windings create fields in the air gap of the machine which interact to create both torque and force. The fields have two dominate harmonics: p pole-pairs which create torque and $p_s$ pole-pairs which create suspension forces. The fields' harmonic numbers differ by one pole-pair, i.e., $p_s=p\pm1$. There are several different popular realizations of these windings, each with its own properties.

Multi-Phase Combined Winding

Figure 5A:
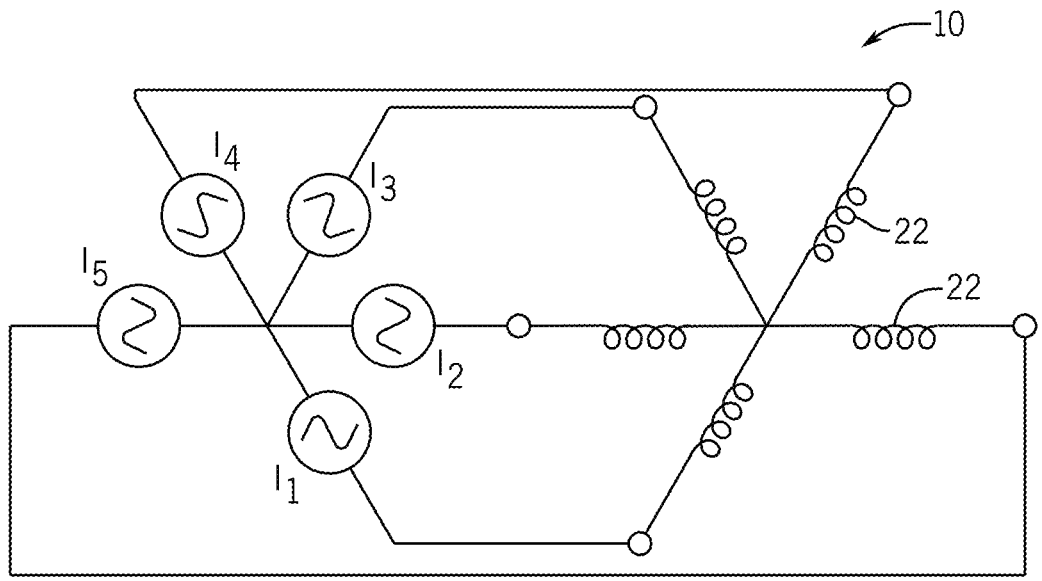
FIGS. 5a-5c are figures similar to that of FIG. 3 for alternative combined winding designs.

To solve the significant power density disadvantage of the separated winding, the popular multi-phase (MP) combined winding can be used as described in reference [12] and depicted in FIG. 5a. This is an example of a combined winding without a tap. During run-time, the slot current can be dynamically allocated to either force and/or torque, thus solving the key disadvantage of the separated winding. However, this causes the actuation of torque and force to become tightly coupled, requiring a more complicated control methodology. Furthermore, each phase must carry both the torque and suspension current which typically results in more expensive power electronics compared to the separated winding.

Dual-Purpose No-Voltage Winding

The dual-purpose no-voltage (DPNV) winding offers a circuit-based solution to the drawbacks of the MP combined winding discussed in references [13]-[15]. The DPNV winding is also a combined winding, i.e., the force and torque capability is dynamically adjustable at run-time. The key advantage of the DPNV winding is that the suspension terminals of the machine are not exposed to the motor's back-EMF. Because of this, the suspension power electronics can be rated for much lower blocking voltages which becomes most attractive for high-speed applications. The DPNV winding can be implemented as either a bridge or parallel winding.

Figure 5B:
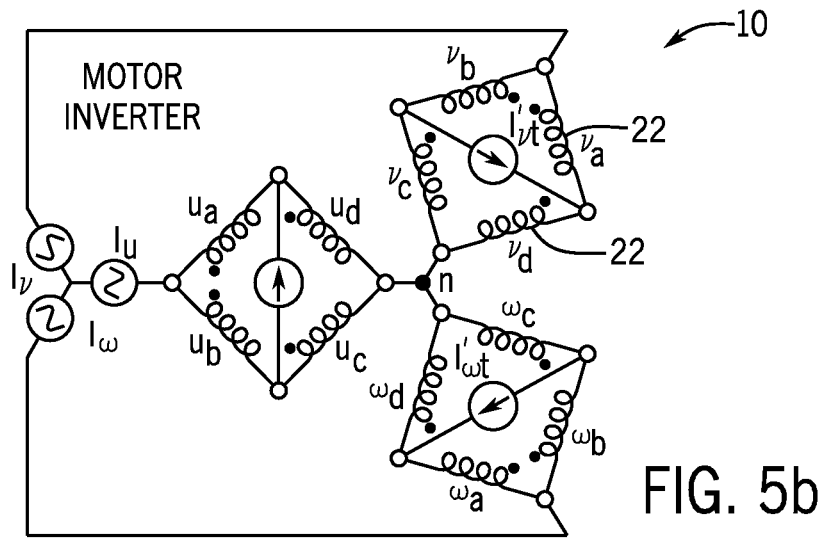

The bridge DPNV winding offers decoupled operation of force and torque but requires more power electronics and isolated dc links than the MP combined winding and is shown in FIG. 5b. This approach is best suited for high-power and high-speed applications where the main torque inverter can be a standard 3-phase motor drive [13], [14]. The suspension power electronics are three isolated single-phase low-power and low-voltage inverters.

The parallel DPNV winding is a circuit-based implementation of the m=6 phase MP combined winding described in reference [16] and discussed in more detail above with respect to FIG. 3. To the drive, the parallel DPNV winding appears as two 3-phase systems, similar to the separated winding. However, due to the winding connections, the suspension inverter must sink half the torque inverter current. Furthermore, power can flow between the two inverters. For these reasons, the parallel DPNV winding is best suited for high-speed, low-motor-current applications.

Mid-Point Current Injection Winding

Figure 5C:
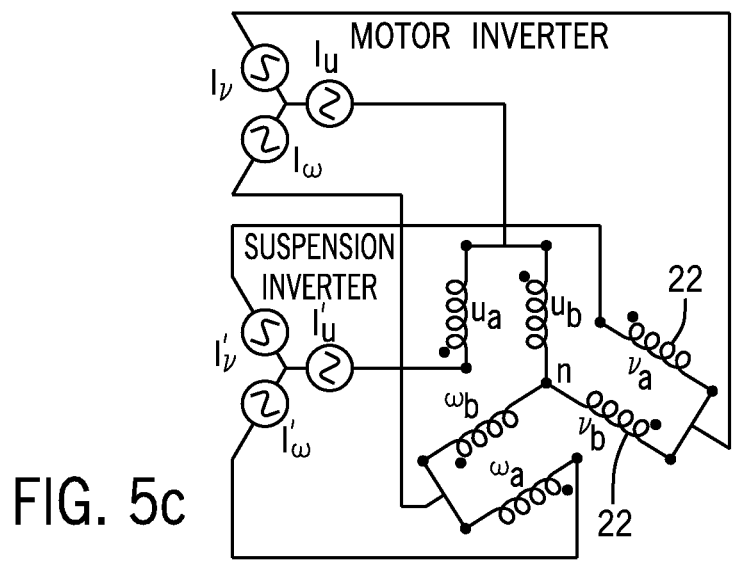

The mid-point current injection (MCI) winding is very similar in form to the parallel DPNV winding; however, the torque and suspension inverters are swapped per reference [17] and as shown in FIG. 5c. This means that the torque inverter must sink half the suspension force current and the torque inverter is exposed to double the motor's back-EMF. The MCI winding is best suited for low-speed, high-motor-current applications.

Modeling Approach

The invention provides models for each of these motor types to provide displacement self-sensing in the bearingless motor winding topologies described in the previous section. Self-sensing operates under the assumption that motion state variation (e.g., rotor displacement, angle, velocity, etc.) causes variations in the electrical state which can be measured. Therefore, an accurate model is needed which explains how the rotor motion couples into the electrical state, i.e., voltages and currents.

The electromagnetic equation of any winding set is:

$$v_{ph}(t) = R_{ph} i_{ph}(t) + \frac{d}{dt} \lambda_{ph}(t) \tag{1}$$

where the bold symbols denote vectors or matrices, the subscript "1" denotes phase quantities, $v_{ph}(1)$ is the voltage vector, $i_{ph}(1)$ is the current vector, $\lambda_{ph}(1)$ is the flux linkage vector, and $R_{ph}$ is the resistance matrix.

To derive the flux linkage of the winding system, winding function theory is used. The m-phase stator winding is augmented with a rotor winding (denoted by subscript "r") to create a system of m+1 size:

$$\begin{bmatrix} \lambda_1 \\ \vdots \\ \lambda_m \\ \lambda_r \end{bmatrix} = \underbrace{\begin{bmatrix} L_{1,1} & \cdots & L_{1,m} & L_{1,r} \\ \vdots & \ddots & \vdots & \vdots \\ L_{m,1} & \cdots & L_{m,m} & L_{m,r} \\ L_{r,1} & \cdots & L_{r,m} & L_{r,r} \end{bmatrix}}_{L_{ph+rotor}} \begin{bmatrix} i_1 \\ \vdots \\ i_m \\ i_r \end{bmatrix} \tag{2}$$

The inductance matrix $L_{ph+rotor}$ from above can be divided into subblocks along the horizontal and vertical lines:

$$L_{ph+rotor} = \begin{bmatrix} L_{ph} & L_{ph,r} \\ L_{r,ph} & L_{r,r} \end{bmatrix} \tag{3}$$

The developed model is a non-salient sinusoidal constant flux rotor, e.g., an idealized surface permanent magnet (PM) rotor. The rotor winding current is constant, $i_r(t)=I_r$, and the effects of the stator currents on the rotor flux linkage are ignored, i.e., ignoring the second row.

The final m×n governing equation in matrix form for the phases of the winding system (including the rotor) is given as:

$$v_{ph}(t) = R_{ph} i_{ph}(t) + \frac{d}{dt}(L_{ph} i_{ph}(t) + L_{ph,r} I_r) \tag{4}$$

Modified Winding Functions

To incorporate the effects of a non-centered rotor, modified winding function theory is used to derive the flux linkage vector as a function of rotor position. The resistance matrix $R_{ph}$ is taken as constant for an eccentric rotor.

Modified winding function theory allows for modeling non-uniform permanence around the air gap of an electric machine. This can equivalently model non-uniform air gap length as in the case of an eccentric rotor. The inverse air gap is modeled as $g^{-1}(\phi)$ which incorporates the rotor eccentricity.

The phase winding inductance matrix is computed using the modified winding function theory [11] where the inductance $L_{a,b}$ relates the flux linking phase a to current from phase b. It is given as:

$$L_{a,b}(\theta) = \mu_0 r l \int_0^{2\pi} N_a(\phi,\theta) M_b(\phi,\theta) g^{-1}(\phi,\theta) d\phi \quad (5)$$

where $\phi$ denotes the circumferential angle around the air gap, $\theta$ is the angle of the rotor, $\mu_0$ is the magnetic permeability in a classical vacuum, r is the radius of the rotor, l is the axial length, $N_a(\phi, \theta)$ is the winding function for the a phase, $M_b(\phi, \theta)$ is the modified winding function for the b phase [11], which is defined as:

$$M_b(\phi, \theta) = N_b(\phi, \theta) - \{M_b(\theta)\} \quad (6)$$

$$\{M_b(\theta)\} = \frac{1}{2\pi g^{-1}} \int_0^{2\pi} N_b(\phi, \theta) g^{-1}(\phi, \theta) d\phi \quad (7)$$

Air Gap Model

Accurate modeling of an eccentric rotor requires an accurate inverse air gap model. In this paper, the rotor is assumed cylindrical and non-salient.

Figure 6:
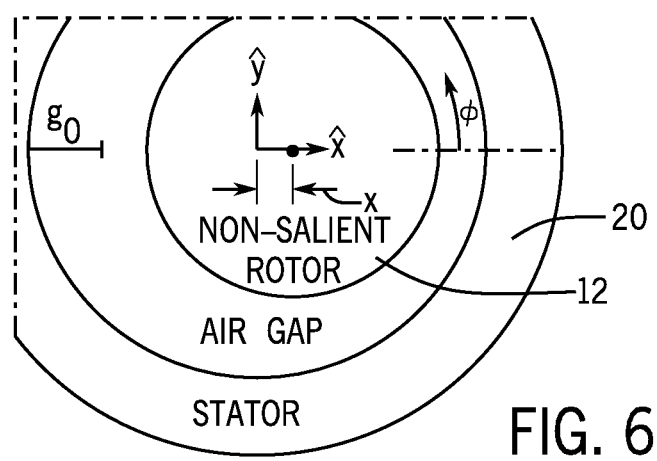
FIG. 6 is a simplified cross-sectional representation of a stator and rotor showing the air gap therebetween.

Referring to FIG. 6, for small displacement relative to the nominal air gap $g_0$, i.e., $x \ll g_0$ and $y \ll g_0$, the air gap length as a function of circumferential angle $\phi$ and rotor displacement x and y can be approximated:

$$g(\phi, x, y) \approx g_0 - x \cos(\phi) - y \sin(\phi) \quad (8)$$

Computing the inverse air gap, i.e., $g^{-1} = 1/g$, results in a non-linear function in both x and y. The Taylor series expansion is computed and only the first term is kept to arrive at the final linearized inverse air gap model:

$$g^{-1}(\phi, x, y) \approx \frac{1}{g_0} + \frac{x \cos(\phi)}{g_0^2} + \frac{y \sin(\phi)}{g_0^2} \quad (9)$$

The approximate model of (9) is only valid for small displacements of the rotor.

For an error bound of 10% for the inverse air gap model $g^{-1}$, the maximum rotor displacement must be less than 30% of the nominal air gap length $g_0$.

Definition of Winding Functions

To derive the inductance of the windings depicted in FIGS. 3 and 5a-5c, the winding functions need to be defined. Each winding topology has a unique set of winding functions. The winding functions are defined around the circumferential angle of the stator $\phi$ and are a function of rotor angle $\theta$. Both $\phi$ and $\theta$ denote mechanical angle, not electrical.

The rotor is modeled as a p pole-pair winding at angle $\theta$ where $\theta$ is the mechanical angle between the torque harmonic winding phase u-axis and the rotor's d-axis $$N_r(\phi,\theta) = N_{rotor} \cos(p(\phi+\theta)) \quad (10)$$

Multi-Phase Combined Winding

The MP combined winding is composed of phases which produce two spatial air gap harmonics, p and $p_s$. Phase k of an m-phase MP combined winding is given as:

$$N_k(\phi, \theta) = N_p \cos\left(p\phi - (k-1)p\frac{2\pi}{m}\right) + N_{ps} \cos\left(p_s\phi - (k-1)p_s\frac{2\pi}{m}\right) \quad (12)$$

DPNV Winding.

The parallel and bridge DPNV winding functions can be derived based on the MP combined winding. The mapping of winding functions from MP to DPNV is machine parameter specific. There are four cases based on the winding phase separation and phase order. Given m, p, and $p_s$, compute the phase separation as $$\alpha_t = p\frac{2\pi}{m} \text{ and } \alpha_s = p_s \frac{2\pi}{m}.$$

Based on $a_t$ and $a_s$ (wrapped to $\pm \pi$), the mapping from MP to DPNV is given in Table I.

TABLE I

MAPPING FROM 6-PHASE MP TO DPNV

| DPNV Coil Group | Case 1[a] $\alpha_t = +2\pi/6$ $\alpha_s = +2\pi/3$ | Case 2 $\alpha_t = -2\pi/6$ $\alpha_s = -2\pi/3$ | Case 3 $\alpha_t = +2\pi/3$ $\alpha_s = +2\pi/6$ | Case 4 $\alpha_t = -2\pi/3$ $\alpha_s = -2\pi/6$ |
|---|---|---|---|---|
| $u_a$ | −4 | −4 | +4 | +4 |
| $u_b$ | +1 | +1 | +1 | +1 |
| $v_a$ | −6 | −2 | +2 | +6 |
| $v_b$ | +3 | +5 | +5 | +3 |
| $w_a$ | −2 | −6 | +6 | +2 |
| $w_b$ | +5 | +3 | +3 | +5 |

[a] The table entries denote the MP phase number and polarity of connection.

For example, for p=1 and $p_s=2$, the parallel DPNV winding functions are given as in reference [16]. This matches Case 1 from Table I, i.e., $a_t + 2\pi/6$ and $a_s = +2\pi/3$.

$$N_{u,a}(\phi,\theta) = -N_4(\phi,\theta), N_{u,b}(\phi,\theta) = N_1(\phi,\theta)$$

$$N_{v,a}(\phi,\theta) = -N_6(\phi,\theta), N_{v,b}(\phi,\theta) = N_3(\phi,\theta)$$

$$N_{w,a}(\phi,\theta) = -N_2(\phi,\theta), N_{w,b}(\phi,\theta) = N_5(\phi,\theta) \quad (13)$$

where the DPNV winding denotes the phase and the second (e.g., a) denotes the coil group, see [13]-[15].

The bridge DPNV winding functions (denoted by ') can be derived from the parallel DPNV winding functions as effectively splitting the coil groups in half:

$$N'_{u,a}(\phi, \theta) = N'_{u,b}(\phi, \theta) = \frac{1}{2} N_{u,a}(\phi, \theta) \quad (14)$$

$$N'_{u,c}(\phi, \theta) = N'_{u,d}(\phi, \theta) = \frac{1}{2} N_{u,b}(\phi, \theta)$$

$$N'_{v,a}(\phi, \theta) = N'_{v,b}(\phi, \theta) = \frac{1}{2} N_{v,a}(\phi, \theta)$$

-continued $$N'_{v,c}(\phi, \theta) = N'_{v,d}(\phi, \theta) = \frac{1}{2}N_{v,b}(\phi, \theta)$$

$$N'_{w,a}(\phi, \theta) = N'_{w,b}(\phi, \theta) = \frac{1}{2}N_{w,a}(\phi, \theta)$$

$$N'_{w,c}(\phi, \theta) = N'_{w,d}(\phi, \theta) = \frac{1}{2}N_{w,b}(\phi, \theta)$$

In general, the bridge and parallel DPNV windings are related where the sum of the winding functions for the bridge a and c coil groups equals the parallel DPNV a coil group winding function. The split does not have to be perfectly in half as in [14].

Mid-Point Current Injection Winding

The MCI winding is a variation of the parallel DPNV winding where the connection to the a coil group is reversed. The physical winding is identical to the parallel DPNV winding, so it uses the same winding functions as in (13).

Voltage and Current Transformations

Each bearingless motor winding topology has, in general, m phases. Using modified winding function theory, the voltage equation of (4) can be computed including the effects of an eccentric rotor.

However, for control/self-sensing purposes, it is useful to transform each topology's voltage and current vectors into a new consistent coordinate system. This system is defined as the $\alpha\beta$ components of both the torque and suspension systems, i.e., it has the dimension 4×4. The change of coordinate transforms are responsible for decoupling force from torque so that a single voltage component results in a single current component which creates a single torque or force. For example, applying $v_{a,s}$ causes an a-axis suspension current $i_{a,s}$ to flow, which creates a-axis force (assuming the appropriate fixed rotor angle). Note that the $\alpha\beta$ coordinate system is stationary, not synchronously rotating with the rotor.

Starting from the in-phase equation of (4), transform matrices $T_c$, $T_v$, and $T_i$ can be defined which convert the phase system into the decoupled 4×4 system.

For the separated and MP combined windings, the in-phase terminal quantities $v_{ph}$ and $i_{ph}$ are directly transformed to decoupled $\alpha\beta$ components via the generalized Clarke transform:

$$v_{\alpha\beta}=T_c v_{ph} \quad i_{\alpha\beta}=T_c i_{ph} \tag{15}$$

For the DPNV and MCI windings, the winding is defined by coil groups. Denote $v'_{ph}$ as the voltage across a coil group, $v_{ph}$ as the terminal voltage, $i'_{ph}$ as the current through a coil group, and $i_{ph}$ as the current associated with torque/force. To convert between voltage and current representations, $T_v$ and $T_i$ are defined. The terminal voltages $v_{ph}$ are computed using KVL from the winding terminal to the neutral. The coil group currents $i'_{ph}$ are transformed into effective currents $i_{ph}$ for force/torque control using DPNV identities per reference [15]:

$$v_{ph}=T_v v'ph \quad i_{ph}=T_i i'_{ph} \tag{16}$$

Then, the same generalized Clarke transform approach can be used like the separated and MP combined windings. For the separated and MP combined windings, both $T_v$ and $T_i$ are simply the m×m identity matrix.

Applying both $T_v$ and $T_i$ to [4] gives:

$$v_{ph}(t) = T_v R_{ph} T_i^{-1} i_{ph}(t) + \frac{d}{dt}\left(T_v L_{ph} T_i^{-1} i_{ph}(i) + T_v L_{ph,r} I_r\right) \tag{17}$$

Applying the generalized Clarke transform gives:

$$v_{\alpha\beta}(t) = T_c T_v R_{ph} T_i^{-1} T_c^{-1} i_{\alpha\beta}(t) + \frac{d}{dt}\left(T_c T_v L_{ph} T_i^{-1} T_c^{-1} i_{\alpha\beta}(t) + T_c T_v L_{ph,r} I_r\right) \tag{18}$$

Equation 18 results in a 4×1 voltage vector which can be grouped into matrices. The groupings isolate the terms acting on the current $i_{\alpha\beta}(t)$, i.e., the effective resistance R, the derivative of the current $$\frac{d}{dt}i_{\alpha\beta}(t),$$

i.e., the effective inductance L, and the rotor current $I_r$, i.e., the effective back-EMF $e_{\alpha\beta}(t)$ The final model is of the form:

$$v_{\alpha\beta}(t) = Ri_{\alpha\beta}(t) + L\frac{d}{dt}i_{\alpha\beta}(t) + e_{\alpha\beta}(t) \tag{19}$$

where:
$v_{\alpha\beta}(t)=[v_{\alpha,t}(t), v_{\beta,t}(t), v_{\alpha,s}(t), v_{\beta,s}(t)]^T$
$i_{\alpha\beta}(t)=[i_{\alpha,t}(t), i_{\beta,t}(t), i_{\alpha,s}(t), i_{\beta,s}(t)]^T$
$e_{\alpha\beta}(t)=[e_{\alpha,t}(t), e_{\beta,t}(t), e_{\alpha,s}(t), e_{\beta,s}(t)]^T$
and both R and L are of size 4×4 and functions of time due to generally dynamic rotor position: x(t), y(t), and $\theta(t)$.

Multi-Phase Combined Winding

The MP combined winding topology is composed of t phases which all contribute to creating both torque and force. Through the generalized Clarke transform of reference [18], the MP combined winding can be decomposed into orthogonal sub-planes which act to decouple the torque and force systems. The output of the generalized Clarke transform is multiple $\alpha\beta$ components which are all distinct and decoupled.

The generalized Clarke transform can be described as follows using space vectors (i.e., complex numbers):

$$T_c = \frac{1}{3}\begin{bmatrix} 1 & 1/2 & -1/2 & -1 & -1/2 & 1/2 \\ 0 & \sqrt{3}/2 & \sqrt{3}/2 & 0 & -\sqrt{3}/2 & -\sqrt{3}/2 \\ 1 & -1/2 & -1/2 & 1 & -1/2 & -1/2 \\ 0 & \sqrt{3}/2 & -\sqrt{3}/2 & 0 & \sqrt{3}/2 & -\sqrt{3}/2 \end{bmatrix} \tag{24}$$

where $\vec{i}_t$ and $\vec{i}_s$ denote the decoupled current space vectors which create torque and suspension force, $i_k$ is the current in phase k, and where c determines if the transform is amplitude or power invariant. The transform can be applied to the winding currents, voltages, or flux linkages.

For application to the matrix equations, equations (23) and (24) can be written in matrix form. For example, the m=6 phase amplitude-invariant transform (ignoring zero-sequence components) for pole-pairs p=1 and $p_s=2$ is:

$$\vec{i}_t = i_{\alpha,t} + ji_{\beta,t} = c\sum_{k=1}^{m} i_k e^{jp[k-1]\frac{2\pi}{m}} \tag{22}$$

$$\vec{i}_s = i_{\alpha,s} + ji_{\beta,s} = c\sum_{k=1}^{m} i_k e^{jp_s[k-1]\frac{2\pi}{m}} \tag{23}$$

such that both the voltage and current vector transforms hold:

$$v_{\alpha\beta}=T_c v_{1\ldots 6} \quad i_{\alpha\beta}=T_c i_{1\ldots 6} \quad (25)$$

where $v_{1\ldots 6}$ and $i_{1\ldots 6}$ denote the 6-phase voltage and current vectors, i.e., $i_{1\ldots 6}=[i_1 i_2 i_3 i_4 i_5 i_6]^T$.

Parallel Dual-Purpose No-Voltage Winding

The parallel DPNV bearingless motor winding topology is a circuit-based implementation of the m=6 phase MP combined winding. By carefully designing the phase connections and making slight adjustments to the control, the generalized Clarke transform is effectively implemented in hardware. This means that additional voltage and current transforms must be made to decouple the torque and force output. The transformation from phase voltage and current to effective uvw components is not the same, so two unique transformations must be applied.

For the voltage transform, the motor and inverter neutrals are assumed to be at the same potential and KVL loops are followed from the inverter to the neutral:

$$T_v = \begin{bmatrix} 0 & 1 & 0 & 0 & 0 & 0 \\ 0 & 0 & 0 & 1 & 0 & 0 \\ 0 & 0 & 0 & 0 & 0 & 1 \\ -1 & 1 & 0 & 0 & 0 & 0 \\ 0 & 0 & -1 & 1 & 0 & 0 \\ 0 & 0 & 0 & 0 & -1 & 1 \end{bmatrix}$$

such that $v_{uvw,ts}=T_v v_{uvw,ah}$ where the voltages of the parallel DPNV coil groups are arranged as $v_{uvw,ab}=[v_{u,a} \; v_{u,b} \; v_{v,a} \; v_{v,b} \; v_{w,a} \; v_{w,b}]^T$.

For the current transform, the parallel DPNV identity [15] is used where $i_r=i_a+i_b$ and $$i_s = (i_b - i_a)/2: \; T_i = \begin{bmatrix} 1 & 1 & 0 & 0 & 0 & 0 \\ 0 & 0 & 1 & 1 & 0 & 0 \\ 0 & 0 & 0 & 0 & 1 & 1 \\ -1/2 & 1/2 & 0 & 0 & 0 & 0 \\ 0 & 0 & -1/2 & 1/2 & 0 & 0 \\ 0 & 0 & 0 & 0 & -1/2 & 1/2 \end{bmatrix}$$

such that $i_{uvw,ts}=T_i i_{uvw,ab}$ where currents of the coil groups of the parallel DPNV winding are arranged like the voltages, i.e., $i_{uvw,ab}=[i_{u,a} \; i_{u,b} \; i_{v,a} \; i_{w,a} \; i_{w,b}]^T$.

After applying $T_v$ to the voltages and $T_i$ to the currents, the 6×6 parallel DPNV system can be transformed to $\alpha\beta$ components using the standard Clarke transform from [20].

Bridge Dual-Purpose No-Voltage Winding

The bridge DPNV bearingless motor winding topology is an alternative arrangement to the parallel DPNV winding which allows for decoupled force and torque operation using a circuit-based approach. Similarly, transforms $T_v$ and $T_i$ are needed to convert the coil group voltages and currents into effective uvw quantities.

For the voltages, $$T_v = \begin{bmatrix} 1 & 0 & 0 & 1 & 0 & 0 & 0 & 0 & 0 & 0 & 0 & 0 \\ 0 & 0 & 0 & 0 & 1 & 0 & 0 & 1 & 0 & 0 & 0 & 0 \\ 0 & 0 & 0 & 0 & 0 & 0 & 0 & 0 & 1 & 0 & 0 & 1 \\ 0 & 0 & -1 & 1 & 0 & 0 & 0 & 0 & 0 & 0 & 0 & 0 \\ 0 & 0 & 0 & 0 & 0 & 0 & -1 & 1 & 0 & 0 & 0 & 0 \\ 0 & 0 & 0 & 0 & 0 & 0 & 0 & 0 & 0 & 0 & -1 & 1 \end{bmatrix}$$

such that $v_{uvw,ts}=T_v v_{uvw,abcd}$ where the voltages of the bridge DPNV coil groups are arranged as $v_{uvw,abcd}=[v_{u,a} \; v_{u,b} \; v_{u,c} \; v_{u,d} \; v_{v,a} \; v_{v,b} \; v_{v,c} \; v_{v,d} \; v_{w,a} \; v_{w,b} \; v_{w,c} \; v_{w,d}]^T$.

For the currents:

$$T_i = \frac{1}{2}\begin{bmatrix} 1 & 1 & 1 & 1 & 0 & 0 & 0 & 0 & 0 & 0 & 0 & 0 \\ 0 & 0 & 0 & 0 & 1 & 1 & 1 & 1 & 0 & 0 & 0 & 0 \\ 0 & 0 & 0 & 0 & 0 & 0 & 0 & 0 & 1 & 1 & 1 & 1 \\ -1 & 1 & -1 & 1 & 0 & 0 & 0 & 0 & 0 & 0 & 0 & 0 \\ 0 & 0 & 0 & 0 & -1 & 1 & -1 & 1 & 0 & 0 & 0 & 0 \\ 0 & 0 & 0 & 0 & 0 & 0 & 0 & 0 & -1 & 1 & -1 & 1 \end{bmatrix}$$

such that $i_{uvw,ts}=T_i i_{uvw}$ where the currents of the bridge DPNV coil groups are arranged as $i_{uvw,abcd}=[i_{u,a} \; i_{u,b} \; i_{u,c} \; i_{u,d} \; i_{v,a} \; i_{v,b} \; i_{v,c} \; i_{v,d} \; i_{w,a} \; i_{w,b} \; i_{w,c} \; i_{w,d}]^T$.

After applying $T_v$ to the voltages and $T_i$ to the currents, the new 6×6 bridge DPNV system can be transformed to $\alpha\beta$ components using the standard Clarke transform from reference [20].

Mid-Point Current Injection Winding

The mid-point current injection (MCI) bearingless motor winding topology closely resembles the parallel DPNV winding, except the drive connections have been swapped. To transform the voltages and currents to the 4×4 $\alpha\beta$ model, similar transforms to the parallel DPNV winding can be used where $T_v$ and $T_i$ are, respectively:

$$\begin{bmatrix} 1 & 1 & 0 & 0 & 0 & 0 \\ 0 & 0 & 1 & 1 & 0 & 0 \\ 0 & 0 & 0 & 0 & 1 & 1 \\ 0 & 1 & 0 & 0 & 0 & 0 \\ 0 & 0 & 0 & 1 & 0 & 0 \\ 0 & 0 & 0 & 0 & 0 & 1 \end{bmatrix}, \quad \frac{1}{2}\begin{bmatrix} 1 & 1 & 0 & 0 & 0 & 0 \\ 0 & 0 & 1 & 1 & 0 & 0 \\ 0 & 0 & 0 & 0 & 1 & 1 \\ -2 & 2 & 0 & 0 & 0 & 0 \\ 0 & 0 & -2 & 2 & 0 & 0 \\ 0 & 0 & 0 & 0 & -2 & 2 \end{bmatrix}$$

Bearingless Motor Equivalent $\alpha/\beta$ Model

The above discussions outline all the required mechanisms to derive the $\alpha\beta$ equations for all the bearingless motor winding topologies. For each topology, (18) was solved and grouped in the form of (19).

The results for the amplitude-invariant case of p=1 and $p_s=2$ are compiled and summarized in this section for each bearingless motor winding topology. From (19), of interest are the matrices R and L and the EMF vector $e_{\alpha\beta}$.

Several term groupings are defined:

$$L_t = \frac{m}{2}L_0 N_p^2,$$

$$L_s = \frac{m}{2}L_0 N_{ps}^2,$$

$$M = \frac{m}{2}L_0 N_p N_{ps}$$

$$\lambda_{PM,t} = I_r N_{rotor} N_p L_0,$$

$$\lambda_{PM,s} = I_r N_{rotor} N_{ps} L_0$$

where $$L_0 = \frac{\mu_0 r \ell \pi}{g_0}$$

and the subscripts "t" and "s" denote torque and suspension, respectively.

The term m is the number of phases: for the MP combined winding, m matches the number of drive connections (e.g., m=6); for the separated winding, m=3; for the MCI, bridge, and parallel DPNV windings, m=6.

Throughout the derivation, small rotor displacement is assumed to maintain accuracy of the model, i.e., $x^2=y^2=xy=0$.

Relevant Machine Constants for Displacement Self-Sensing

The two relevant machine constants from the model for displacement self-sensing are (i) the mutual inductance versus displacement constant M', and (ii) the suspension back-EMF constant $\lambda_{PM,s}'$. These can be computed based on the analytic expressions and machine parameters:

$$M' = \frac{M}{2g_0} = \frac{m}{2} \frac{\mu_0 r \ell \pi}{2g_0^2} N_{ps} N_p$$

$$\lambda_{PM,s}' = \frac{\lambda_{PM,s}}{2g_0} = I_r \frac{\mu_0 r \ell \pi}{2g_0^2} N_{ps} N_{rotor}$$

where the SI units of M' are $$\left[\frac{H}{m}\right]$$

and $\lambda_{PM,s}'$ are $$\left[\frac{V}{m \cdot \text{rad}/s}\right].$$

For surface PM rotors, the physical meaning of $I_r$ and $N_{rotor}$ breaks down when the terms are split apart, but when combined, the product indicates the constant MMF from the rotor. In other words, only the product of terms has physical meaning.

Effective αβ Resistance and Inductance Matrices

Due to the inductance matrix of the phase system being a function of time-varying rotor displacements x(t) and y(t), the evaluation of $$\frac{d}{dt}(Li(t))$$

requires the derivative chain rule. The final result is a collection of terms where the rotor velocity, e.g., $$\text{e.g., } \frac{d}{dt}x(t) = v_x(t),$$

multiplies the current, and the rotor displacement x(t) multiplies the derivative of the current. When writing in the matrix form of (19), the rotor velocity terms are collected into the effective R matrix and the displacement terms are collected into the effective L matrix.

Effective αβ EMF Vector

The time-varying position of the rotor flux induces an EMF in the stator windings. For a centered rotor, the induced EMF is the standard back-EMF and is only caused by the rotational movement. However, when the rotor is eccentric, the EMF is also a function of rotor displacement and velocity, e.g., x(t) and $v_x(t)$. All terms which depend on the rotor flux are grouped into the $e_{\alpha\beta}$ vector in (20).

Models

FIG. 7 show the results of the derivation (R, L, and $e_{\alpha\beta}$) for each winding for these different motor types. Each matrix element that depends on x, y, or both is evident from inspection. The rotor position states, x(t), y(t), θ(t) and their derivatives, do not explicitly show a time dependence, but, in general, are a function of time.

Discussion on Self-Sensing Feasibility

The R, L, and $e_{\alpha\beta}$ quantities from FIG. 7 can be used for self-sensing since the rotor position (i.e., x, y, θ) appears in the model parameters and the EMF signals. Multiple approaches can be used to extract the rotor position from the voltages and currents: both circuit-based and controls-based approaches. The literature has examples of self-sensing for separated windings, e.g., [1], [3], [6].

Circuit-Based Self-Sensing

FIG. 7 shows that by measuring signals directly from the winding, rotor eccentricity can be detected. Most obvious is due to $e_{\alpha\beta}$ where additional terms appear for an eccentric rotor. By using a simple voltage sensor (e.g., voltage divider), all windings provide effective terminals which indicate eccentricity. Circuit-based solutions can also be used to measure changes in inductance; for example, injecting an excitation into the suspension terminals of the bridge or MCI windings, and measuring the voltage or current at the torque terminals.

Many standard three-phase motor windings can be converted to DPNV (and MCI) windings by bringing out additional end connections per reference [14]. So therefore, the above results can be used for condition monitoring of standard (non-bearingless) motors, by simply adding connections to their stator winding.

Controls-Based Self-Sensing

For systems which are sensing/regulating current into all terminals of the windings, controls-based approaches can be applied for self-sensing. For standard motor windings, this technique has been investigated in great depth for rotary self-sensing per reference [19], i.e., estimating θ and r0. Two approaches are commonly used which exploit both the parameter dependence on rotor position and the EMF variation.

High-frequency (HF) injection can be used to measure values of the R and L matrices. In rotary systems, this technique is commonly used to estimate spatial inductance variation. Based on the HF current response from the HF voltage injection, the controller computes the impedance of the system, which encodes the rotor position.

Since it is impractical to directly measure the motor's back-EMF during operation, common techniques to make use of the spatial dependence in the EMF rely on state estimators to derive the EMF state. Then, vector-tracking structures can be used to infer rotor position from the rotating EMF vector per reference [20].

These approaches for rotary self-sensing can be directly applied to bearingless motor eccentric rotor self-sensing. However, accurate knowledge of how the winding parameters (R and L) and EMF are affected due to eccentricity is required.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

REFERENCES

[1] T. Kuwajima, T. Nobe, K. Ebara, A. Chiba, and T. Fukao, "An estimation of the rotor displacements of bearingless motors based on a high frequency equivalent circuits," in 4th IEEE International Conference on Power Electronics and Drive Systems, vol. 2, 2001, pp. 725-731.

[2] A. Chiba, T. Fukao, 0. Ichikawa, M. Oshima, M. Takemoto, and D. Dorrell, Magnetic Bearings and Bearingless Drives. Newnes, 2005.

[3] T. Tera, Y. Yamauchi, A. Chiba, T. Fukao, and M. Rahman, "Performances of bearingless and sensorless induction motor drive based on mutual inductances and rotor displacements estimation," IEEE Transactions on Industrial Electronics, vol. 53, no. 1, pp. 187-194, 2006.

[4] H. Nian, Y. He, D. Chen, and L. Huang, "Self-sensing of the rotor position and displacement for an inset permanent magnet type bearingless motor," in 2007 International Conference on Electrical Machines and Systems (ICEMS), 2007, pp. 1508-1512.

[5] H. Zhao, X. Cao, and Z. Deng, "Position and radial displacement sensorless control method for bearingless switched reluctance motors," in 2014 17th International Conference on Electrical Machines and Systems (ICEMS), 2014, pp. 738-743.

[6] Y. Hua and H. Zhu, "Rotor radial displacement sensorless control of bearingless permanent magnet synchronous motor based on mras and suspension force compensation," ISA Trans, vol. 103, pp. 306-318, 2020.

[7] A. Chiba and J. A. Santisteban, "A pwm harmonics elimination method in simultaneous estimation of magnetic field and displacements in bearingless induction motors," IEEE Transactions on Ind Applications, vol. 48, no. 1, pp. 124-131, 2012.

[8] W. Gruber and M. Stockier, "On the self-sensing technique based on the interlink voltage of two serially connected phase coils," in 2015 IEEE 11th International Conference on Power Electronics and Drive Systems, 2015, pp. 646-651.

[9] T. Wang and J. Huang, "Radial position detection of five-phase bearingless pm motor," in 2016 XXII International Conference on Electrical Machines (ICEM), 2016, pp. 2602-2608.

[10] Y. Chen and Y. Thou, "Radial displacement sensorless control of bearingless flux-switching permanent magnet machines based on difference of symmetric-winding flux linkages," IEEE Transactions on Industrial Electronics, vol. 68, no. 9, pp. 7793-7803, 2021.

[11] N. Al-Nuaim and H. Toliyat, "A novel method for modeling dynamic air-gap eccentricity in synchronous machines based on modified winding function theory," IEEE Transactions on Energy Conversion, vol. 13, no. 2, pp. 156-162, 1998.

[12] H. Mitterhofer, B. Mrak, and W. Gruber, "Comparison of high-speed bearingless drive topologies with combined windings," IEEE Transactions on Industry Applications, vol. 51, no. 3, pp. 2116-2122, 2015.

[13] E. Severson, S. Gandikota, and N. Mohan, "Practical implementation of dual-purpose no-voltage drives for bearingless motors," IEEE Transactions on Industry Applications, vol. 52, no. 2, pp. 1509-1518, 2016.

[14] E. L. Severson, R. Nilssen, T. Undeland, and N. Mohan, 'Design of dual purpose no-voltage combined windings for bearingless motors," IEEE Trans. on Industry Applications, vol. 53, no. 5, pp. 4368-4379, 2017.

[15] N. Petersen, A. Khamitov, T. Slininger, and E. L. Severson, "Machine design and precision current regulation for the parallel dpnv bearingless motor winding," IEEE Transactions on Industry Applications, vol. 57, no. 6, pp. 7000-7011, 2021.

[16] A. Khamitov, W. Gruber, G. Bramerdorfer, and E. L. Severson, "Comparison of combined winding strategies for radial nonsalient bearingless machines," IEEE Transactions on Industry Applications, vol. 57, no. 6, pp. 6856-6869, 2021.

[17] A. Chiba, K. Sotome, Y. liyama, and M. A. Rahman, "A novel middle-point-current-injection-type bearingless pm synchronous motor for vibration suppression," IEEE Transactions on Ind. Applications, vol. 47, no. 4, pp. 1700-1706, 2011.

[18] B. Wilamowski and J. Irwin, Power Electronics and Motor Drives, set Electrical engineering handbook series. CRC Press, 2018.

[19] S. Kim and S.-K. Sul, "Sensorless control of ac motor where are we now?" in 2011 Intl Conf on Elec. Machines and Systems, 2011, pp. 1-6.

[20] H. Kim, M. Harke, and R. Lorenz, "Sensorless control of interior permanent-magnet machine drives with zero-phase lag position estimation," IEEE Trans. on Ind. App., vol. 39, no. 6, pp. 1726-1733, 2003.

What we claim is:

1. A rotating electrical machine comprising:
a rotor having a shaft for rotation along a shaft axis;
a stator operating with the rotor to provide a three- or six-phase rotating electrical machine and providing a set of combined windings, the set of combined windings capable of creating a first rotational magnetic field harmonic associated with torque production for rotation of the rotor when the electrical machine is operating as a motor, and capable of generating electrical current from rotation of the rotor when the electrical machine is operating as a generator, and capable of measuring a second rotational magnetic field harmonic associated with displacement of the rotor perpendicular to the shaft axis; and
a controller measuring at least one of electrical voltage and current in at least one phase of at least one combined winding to deduce rotor offset position with respect to the stator perpendicular to this shaft axis by applying the measured voltage and current to a motor model to obtain two perpendicular components of rotor offset position.

2. The rotating electrical machine of claim 1 wherein the controller further controls the electrical voltage and current in the combined windings to apply a levitating force to the rotor based on the obtained two perpendicular components of rotor offset position.

3. The rotating electrical machine of claim 1 wherein the model provides a relationship between at least one of resistance, inductance, and back EMF between the rotor and the at least one combined winding as a function of the two perpendicular components of rotor offset position.

4. The rotating electrical machine of claim 1 wherein the controller applies the measured voltage and current to multiple models providing different relationships between resistance, inductance, and back EMF between the rotor and the at least one combined winding as a function of two perpendicular components of rotor offset position and combines those measurements to provide the two perpendicular components of rotor offset position.

5. The rotating electrical machine of claim 4 wherein the controller further receives a rotor rotation speed value and the combination of back EMF and inductance emphasizes inductance at low rotor rotation speeds compared to relatively higher order rotation speeds for deducing rotor displacement.

6. The rotating electrical machine of claim 1 wherein the rotating electrical machine is an MP combined motor and the model is in the form of:

$$\begin{bmatrix} R & 0 & v_xM' & v_yM' \\ 0 & R & -v_yM' & v_xM' \\ v_xM' & -v_yM' & R & 0 \\ v_yM' & v_xM' & 0 & R \end{bmatrix}$$

where R is resistance;
$v_x$ is velocity in the x perpendicular component;
$v_y$ is velocity in the y perpendicular component;
$g_0$ is the nominal air gap;
M' is $$\frac{6}{2}\frac{\mu_0 r l \pi}{2g_0^2}N_pN_{ps};$$

where $\mu_0$ is the magnetic permeability;
r is the radius of the rotor;
l is an axial length of the rotor;
$N_p$ is the amplitude of the winding function at the torque harmonic; and
$N_{ps}$ is the amplitude of the winding function at the suspension harmonic.

7. The rotating electrical machine of claim 1 wherein the rotating electrical machine is an MP combined motor and the model is in the form of:

$$\begin{bmatrix} L_t & 0 & xM' & yM' \\ 0 & L_t & -yM' & xM' \\ xM' & -yM' & L_s & 0 \\ yM' & xM' & 0 & L_s \end{bmatrix}$$

where L is inductance;
$g_0$ is the nominal air gap;
M' is $$\frac{6}{2}\frac{\mu_0 r l \pi}{2g_0^2}N_pN_{ps};$$

$L_t$ is $$\frac{6}{2}\frac{\mu_0 r l \pi}{g_0}N_p^2;$$

$L_s$ is $$\frac{6}{2}\frac{\mu_0 r l \pi}{g_0}N_{ps}^2;$$

where $\mu_0$ is the magnetic permeability;
r is the radius of the rotor;
l is an axial length of the rotor;
$N_p$ is the amplitude of the winding function at the torque harmonic; and
$N_{ps}$ is the amplitude of the winding function at the suspension harmonic.

8. The rotating electrical machine of claim 1 wherein the rotating electrical machine is an MP combined motor and the model is in the form of:

$$\begin{bmatrix} -\lambda_{PM,t}\omega\sin(\theta) \\ +\lambda_{PM,t}\omega\cos(\theta) \\ -\lambda'_{PM,s}\Delta_\alpha \\ +\lambda'_{PM,s}\Delta_\beta \end{bmatrix}$$

where $$\lambda_{PM,t} = I_r N_{rotor} N_p \frac{\mu_0 r l \pi}{g_0}$$

where $$\lambda'_{PM,s} = I_r N_{rotor} N_{ps} \frac{\mu_0 r l \pi}{2g_0^2}$$

ω is the angular speed of the rotor;
θ is that rotor angle with respect to the stator;
$I_r N_{rotor}$ is the MMF produced by the rotor magnets;
$v_x$ is velocity in the x perpendicular component;
$v_y$ is velocity in the y perpendicular component.

9. The rotating electrical machine of claim 1 wherein the rotating electrical machine is a bridge DPNV combined motor and the model is in the form of:

$$\begin{bmatrix} R & 0 & v_x M' & -v_y M' \\ 0 & R & -v_y M' & -v_x M' \\ v_x M' & -v_y M' & R & 0 \\ -v_y M' & -v_x M' & 0 & R \end{bmatrix}$$

where R is resistance;
$v_x$ is velocity in the x perpendicular component;
$v_y$ is velocity in the y perpendicular component;
$g_0$ is the nominal air gap;
M' is $$\frac{6}{2} \frac{\mu_0 r l \pi}{2g_0^2} N_p N_{ps};$$

where $\mu_0$ is the magnetic permeability;
r is the radius of the rotor;
l is an axial length of the rotor;
$N_p$ is the amplitude of the winding function at the torque harmonic; and
$N_{ps}$ is the amplitude of the winding function at the suspension harmonic.

10. The rotating electrical machine of claim 1 wherein the rotating electrical machine is a bridge DPNV combined motor and the model is in the form of:

$$\begin{bmatrix} L_t & 0 & xM' & -yM' \\ 0 & L_t & -yM' & -xM' \\ xM' & -yM' & L_s & 0 \\ -yM' & -xM' & 0 & L_s \end{bmatrix}$$

where L is inductance;
$g_0$ is the nominal air gap;
M' is $$\frac{6}{2} \frac{\mu_0 r l \pi}{2g_0^2} N_p N_{ps};$$

$L_t$ is $$\frac{6}{2} \frac{\mu_0 r l \pi}{g_0} N_p^2;$$

$L_s$ is $$\frac{6}{2} \frac{\mu_0 r l \pi}{g_0} N_{ps}^2;$$

where $\mu_0$ is the magnetic permeability;
r is the radius of the rotor;
l is an axial length of the rotor;
$N_p$ is the amplitude of the winding function at the torque harmonic; and
$N_{ps}$ is the amplitude of the winding function at the suspension harmonic.

11. The rotating electrical machine of claim 1 wherein the rotating electrical machine is a bridge DPNV combined motor and the model is in the form of:

$$\begin{bmatrix} -\lambda_{PM,t} \omega \sin(\theta) \\ +\lambda_{PM,t} \omega \cos(\theta) \\ -\lambda'_{PM,s} \Delta_\alpha \\ +\lambda'_{PM,s} \Delta_\beta \end{bmatrix}$$

where $$\lambda_{PM,t} = I_r N_{rotor} N_p \frac{\mu_0 r l \pi}{g_0}$$

where $$\lambda'_{PM,s} = I_r N_{rotor} N_{ps} \frac{\mu_0 r l \pi}{2g_0^2}$$

ω is the angular speed of the rotor;
θ is that rotor angle with respect to the stator;
$I_r N_{rotor}$ is the MMF produced by the rotor magnets;
$v_x$ is velocity in the x perpendicular component;
$v_y$ is velocity in the y perpendicular component.

12. The rotating electrical machine of claim 1 wherein the rotating electrical machine is a parallel DPNV combined motor and the model is in the form of:

$$\begin{bmatrix} \frac{1}{2}(R + v_x M') & \frac{1}{2} v_y M' & R + v_x M' & v_y M' \\ \frac{1}{2} v_y M' & \frac{1}{2}(R - v_x M') & v_y M' & R - v_x M' \\ v_x M' & v_y M' & 2R & 0 \\ v_y M' & -v_x M' & 0 & 2R \end{bmatrix}$$

where R is resistance;
$v_x$ is velocity in the x perpendicular component;
$v_y$ is velocity in the y perpendicular component;
$g_0$ is the nominal air gap;

M' is $$\frac{6}{2}\frac{\mu_0 r l \pi}{2g_0^2}N_p N_{ps};$$

where $\mu_0$ is the magnetic permeability;
r is the radius of the rotor;
l is an axial length of the rotor;
$N_p$ is the amplitude of the winding function at the torque harmonic; and
$N_{ps}$ is the amplitude of the winding function at the suspension harmonic.

13. The rotating electrical machine of claim 1 wherein the rotating electrical machine is a parallel DPNV combined motor and the model is in the form of:

$$\begin{bmatrix} \frac{1}{2}(L_t + xM') & \frac{1}{2}yM' & L_s + xM' & yM' \\ \frac{1}{2}yM' & \frac{1}{2}(L_t - xM') & yM' & L_s - xM' \\ xM' & yM' & 2L_s & 0 \\ yM' & -xM' & 0 & 2L_s \end{bmatrix}$$

where L is inductance;
$g_0$ is the nominal air gap;
M' is $$\frac{6}{2}\frac{\mu_0 r l \pi}{2g_0^2}N_p N_{ps};$$

$L_t$ is $$\frac{6}{2}\frac{\mu_0 r l \pi}{g_0}N_p^2;$$

$L_s$ is $$\frac{6}{2}\frac{\mu_0 r l \pi}{g_0}N_{ps}^2;$$

where $\mu_0$ is the magnetic permeability;
r is the radius of the rotor;
l is an axial length of the rotor;
$N_p$ is the amplitude of the winding function at the torque harmonic; and
$N_{ps}$ is the amplitude of the winding function at the suspension harmonic.

14. The rotating electrical machine of claim 1 wherein the rotating electrical machine is a parallel DPNV combined motor and the model is in the form of:

$$\begin{bmatrix} -\lambda_{PM,t}\omega\sin(\theta) - \lambda'_{PM,s}\Delta_\alpha \\ +\lambda_{PM,t}\omega\cos(\theta) - \lambda'_{PM,s}\Delta_\beta \\ -2\lambda'_{PM,s}\Delta_\alpha \\ -2\lambda'_{PM,s}\Delta_\beta \end{bmatrix}$$

where $$\lambda_{PM,t} = I_r N_{rotor} N_p \frac{\mu_0 r l \pi}{g_0}$$

where $$\lambda'_{PM,s} = I_r N_{rotor} N_{ps} \frac{\mu_0 r l \pi}{2g_0^2}$$

$\omega$ is the angular speed of the rotor;
$\theta$ is that rotor angle with respect to the stator;
$I_r N_{rotor}$ is the MMF produced by the rotor magnets;
$v_x$ is velocity in the x perpendicular component;
$v_y$ is velocity in the y perpendicular component.

15. The rotating electrical machine of claim 1 wherein the rotating electrical machine is an MCI combined motor and the model is in the form of:

$$\begin{bmatrix} 2R & 0 & v_x M' & v_y M' \\ 0 & 2R & v_y M' & -v_x M' \\ R + v_x M' & v_y M' & \frac{1}{2}(R + v_x M') & \frac{1}{2}v_y M' \\ v_y M' & R - v_x M' & \frac{1}{2}v_y M' & \frac{1}{2}(R - v_x M') \end{bmatrix}$$

where R is resistance;
$v_x$ is velocity in the x perpendicular component;
$v_y$ is velocity in the y perpendicular component;
$g_0$ is the nominal air gap;
M' is $$\frac{6}{2}\frac{\mu_0 r l \pi}{2g_0^2}N_p N_{ps};$$

where $\mu_0$ is the magnetic permeability;
r is the radius of the rotor;
l is an axial length of the rotor;
$N_p$ is the amplitude of the winding function at the torque harmonic; and
$N_{ps}$ is the amplitude of the winding function at the suspension harmonic.

16. The rotating electrical machine of claim 1 wherein the rotating electrical machine is an MCI combined motor and the model is in the form of:

$$\begin{bmatrix} 2L_t & 0 & xM' & yM' \\ 0 & 2L_t & yM' & -xM' \\ L_t + xM' & yM' & \frac{1}{2}(L_s + xM') & \frac{1}{2}yM' \\ yM' & L_t - xM' & \frac{1}{2}yM' & \frac{1}{2}(L_s - xM') \end{bmatrix}$$

where L is inductance;
$g_0$ is the nominal air gap;
M' is $$\frac{6}{2}\frac{\mu_0 r l \pi}{2g_0^2}N_p N_{ps};$$

$L_t$ is $$\frac{6}{2}\frac{\mu_0 r l \pi}{g_0}N_p^2;$$

$L_s$ is $$\frac{6}{2}\frac{\mu_0 r l \pi}{g_0}N_{ps}^2;$$

where $\mu_0$ is the magnetic permeability;
r is the radius of the rotor;
l is an axial length of the rotor;
$N_p$ is the amplitude of the winding function at the torque harmonic; and
$N_{ps}$ is the amplitude of the winding function at the suspension harmonic.

17. The rotating electrical machine of claim 1 wherein the rotating electrical machine is an MCI combined motor and the model is in the form of:

$$\begin{bmatrix} -2\lambda_{PM,t}\omega\sin(\theta) \\ +2\lambda_{PM,t}\omega\cos(\theta) \\ -\lambda_{PM,t}\omega\sin(\theta) - \lambda'_{PM,s}\Delta_\alpha \\ +\lambda_{PM,t}\omega\cos(\theta) - \lambda'_{PM,s}\Delta_\beta \end{bmatrix}$$

where $$\lambda_{PM,t} = I_r N_{rotor} N_p \frac{\mu_0 r l \pi}{g_0}$$

where $$\lambda'_{PM,s} = I_r N_{rotor} N_{ps} \frac{\mu_0 r l \pi}{2g_0^2}$$

$\omega$ is the angular speed of the rotor;
$\theta$ is that rotor angle with respect to the stator;
$I_r N_{rotor}$ is the MMF produced by the rotor magnets;
$v_x$ is velocity in the x perpendicular component;
$v_y$ is velocity in the y perpendicular component.

* * * * *